(12) United States Patent
Dohmann et al.

(10) Patent No.: US 8,090,922 B2
(45) Date of Patent: Jan. 3, 2012

(54) CHIP CARDS AND RELATED METHOD FOR MEMORY MANAGEMENT

(75) Inventors: Dierk Dohmann, Dusseldorf (DE); Frank Muller, Dusseldorf (DE)

(73) Assignee: Vodafone Holding GmbH, Dusseldorf (DE)

( * ) Notice: Subject to any disclaimer, the term of this patent is extended or adjusted under 35 U.S.C. 154(b) by 456 days.

(21) Appl. No.: 12/286,123

(22) Filed: Sep. 26, 2008

(65) Prior Publication Data

US 2009/0089519 A1  Apr. 2, 2009

Related U.S. Application Data

(63) Continuation of application No. PCT/EP2007/052926, filed on Mar. 27, 2007.

(30) Foreign Application Priority Data

Mar. 28, 2006  (DE) .......................... 10 2006 014 690

(51) Int. Cl.
*G06F 13/00* (2006.01)
(52) U.S. Cl. ........................ 711/170; 711/156
(58) Field of Classification Search .................. 711/156, 711/170
See application file for complete search history.

(56) References Cited

U.S. PATENT DOCUMENTS

| 6,285,607 | B1* | 9/2001 | Sinclair .......................... 365/200 |
| 7,114,659 | B2* | 10/2006 | Harari et al. ................... 235/492 |
| 7,594,063 | B1* | 9/2009 | Estakhri et al. ................ 711/103 |
| 2003/0105924 | A1* | 6/2003 | Spencer et al. ................ 711/115 |
| 2007/0143616 | A1* | 6/2007 | Everett et al. .................. 713/172 |

FOREIGN PATENT DOCUMENTS

| DE | 199 29 164 A1 | 6/2001 |
| EP | 0 220 718 | 10/1986 |
| WO | WO 03/071430 A1 | 8/2003 |

* cited by examiner

*Primary Examiner* — Reba I. Elmore
(74) *Attorney, Agent, or Firm* — Lawrence G. Fridman

(57) ABSTRACT

A method for the processor controlled administering of a memory of a chip card. Initially, available free memory capacity is determined. Then, the memory is released for storing data. The data in the memory can be deleted. The memory can also be used by new data. A stored indication of the actual amount of free memory space is adapted to the current free memory space. The free memory space is reorganized and allocated. Furthermore, the invention relates to a chip card. The chip card comprises a chip with a memory wherein the memory is managed by a processor-controlled memory management system. An arrangement for identifying used and unused memory are provided. The actual free memory space is displayed by means for displaying.

13 Claims, 1 Drawing Sheet

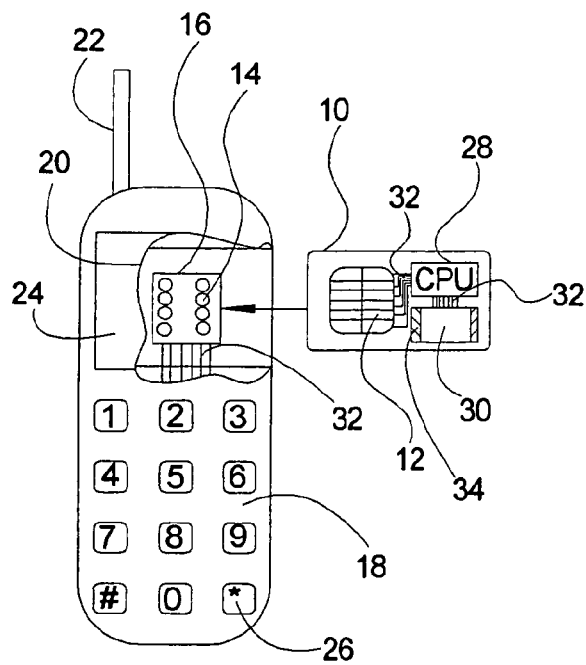
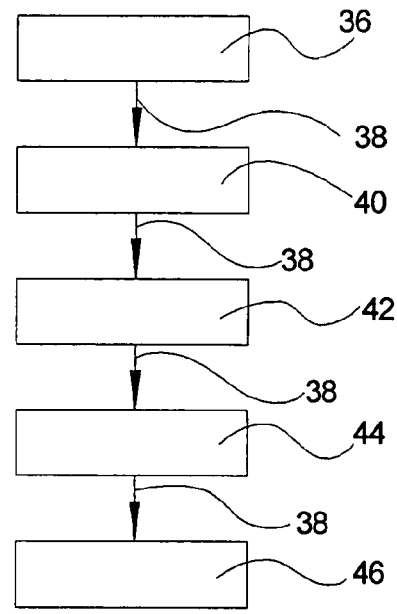
Fig. 1
Fig. 2
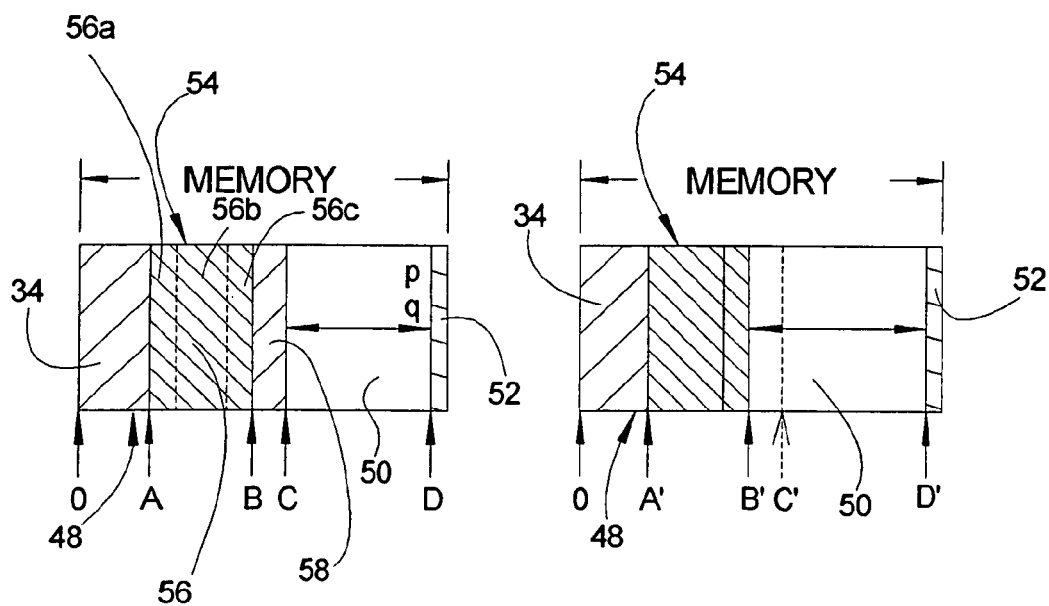
Fig. 3
Fig. 4

CHIP CARDS AND RELATED METHOD FOR MEMORY MANAGEMENT

THIS IS A CONTINUATION OF INTERNATIONAL PATENT APPLICATION PCT/EP2007/052926, FILED Mar. 27, 2007, WHICH CLAIMS PRIORITY OF GERMAN PATENT APPLICATION S.N. 10 2006 014 690.5 FILED Mar. 28, 2006.

FIELD OF THE INVENTION

The invention relates to a method for the processor controlled administering of a memory of a chip card, in particular SIM-, USIM-, bank or medical cards. Further the invention relates to chip cards in particular SIM-, USIM-, bank or medical cards comprising a chip with a memory, wherein the memory is managed by a processor-controlled memory management system, which provides means for identifying used and unused memory.

BACKGROUND OF THE INVENTION

Chip cards, in particular SIM cards, having a memory are well known. The data of the memory can be readout and further processed. Such chip cards are, for example, used by banking institutes, telephone networks, mobile networks, and also physicians for identification and authentication. Chip cards are also used as payment cards. The memory management for known chip cards use proprietary designs. Therefore there is a lack of standard conditions for the behaviour of chip cards regarding memory relevant actions. This is the case in particular for the retrieval of free memory upon release by the chip card.

SUMMARY OF THE INVENTION

It is an object of the invention to fully use the memory capacity and to consistently, quickly release free memory in order to make it available for the storage of data.

According to the invention this object is achieved by a method for the processor-controlled administering of a memory of a chip card, comprising the following steps:
  a) determining the available memory capacity,
  b) releasing the memory for storing data,
  c) storing and/or deleting data in the memory,
  d) adapting a stored indication of the actual amount of free memory space,
  e) reorganizing and allocating the free memory space.

The proposed method unambiguously determines how to access and use the memory of a chip card. The memory must be managed in order to provide such memory on a chip card for data and/or programs.

BRIEF DESCRIPTION OF THE DRAWINGS

FIG. 1 shows a chip card according to the present invention for use in mobile stations.

FIG. 2 shows a diagram of the procedure according to the method of the invention.

FIG. 3 shows a principle schematic of a first memory partition of the chip card memory.

FIG. 4 shows a principle schematic of a second memory partition of the chip card memory.

DETAILED DESCRIPTION OF THE INVENTION

During data administering new data are stored and old data are deleted. Therefore it is necessary that the system of the chip card recognizes how much memory on the chip card is available for each case of use. Each file, which below may also denote program files, consists of digital characters commonly combined in appropriate blocks. Some files, for example an operating system, are virtually not altered in the memory of the chip card. Other files, for example an address file, are constantly changed, especially by updating. Data blocks which are changed if necessary will be deleted or appended in such files. Complete new files can also be written into the memory. In the same way complete files are deleted. Depending on whether data have been removed or have been added the memory space must be released or to be declared as occupied.

In the method of the invention, it is initially determined how much overall memory is available. The free memory is then declared to be unoccupied. If a request to save a file is carried out it can immediately be determined if there is enough memory available for that file. If the memory is insufficient there can be a signal that there is not enough free memory. Such a signal can be received and processed by a querying application. Using, for example, a display the application can inform the user that the memory is insufficient for the intended saving. The value for used and/or free memory is stored at a memory location.

Having clarified the memory space situation of the memory on the chip card, data can now be added or deleted. The such determined actual free memory can then be used for a new use. The value of used or free memory, respectively, can then be adapted to the changed memory space situation. In such a way memory is assigned to requesting applications.

Furthermore, the objects of the invention are achieved by using a chip card of the above mentioned kind comprising means for displaying the current free data memory capacity. Requests by applications regarding free memory can be handled using such chip cards. In that way the memory management can inform any internal or external application about the actual status of the memory of the chip card.

In a preferred modification of the method of the invention the following steps are also provided:
  a) determining of the required memory space
  b) determining the available free memory space
  c) comparing the memory space determined in such way.

The analysis of the memory capacity is thus appointed to determine what amount of memory space is needed. Adjacent the remaining memory capacity is determined. By comparing of requested to free memory capacity the application can be informed whether there is enough memory available.

Another preferred variation of the method of the invention comprises saving the information regarding the free memory in a fixed memory location of the memory. By these measures one achieves that an application requesting free memory only needs to access one fixed memory location to learn the corresponding value. This saves an application that need to determine the available free memory space on a chip card own routines that would provide this information. The application solely has to read out the defined memory location to determine still available free memory.

A preferred modification of the method of the invention for administering the memory of a chip card arises as a result of allocating single memory by a file being used by different applications. With adequate operations the file can be used by these applications. Applications often use one and the same file. Every application would have to save the file separately in the memory of the chip card. Instead of using twice the memory with identical files a wild-card is used. This wild-card makes sure that the application always accesses the right file. The wild-card uses considerably less memory than the file it stands for would need. The wild-card consists of a link or a pointer respectively that links the application with the actual data. By these measures memory is saved. Also the access to the file is accelerated as there are fewer files to choose from.

As to another preferred modification of the method of the invention, the free memory capacity is acquired dynamically for current display. The memory capacity can constantly change. In order that applications always have the current free memory capacity at hand, it is acquired dynamically and currently displayed. The display can also comprise dynamically updating the value in a defined memory location.

In a preferred modification of the chip card of the invention a processor unit is provided for the memory management system. This measure allows operating the chip card self-sufficient from other systems. The processor unit can quickly determine the required memory space and forward the appropriate information to the application which needs memory. These procedures run as far as possible independent on the chip card.

According to a preferred modification of the chip card of the invention an operating system containing instructions for the memory management system is provided in the memory. The instructions an operating system provides can be used by applications to determine the free memory capacity. In doing so merely the data transfer via an interface has to be provided. Therefore it is avoided that applications need their own routines to determine the free memory capacity on the chip card. This can be done by calling an instruction in the operating system which finally delivers the appropriate values for the free memory capacity.

In FIG. 1 a chip card according to the invention is denoted with numeral 10. The chip card 10 is provided with contacts 12 which are in contact with contacts 14 of a chip card reader 16. In the present embodiment the chip card reader is located in a mobile station 18. In order to visualize the chip card reader 16 a portion 20 of the mobile station 18 "is quarried out". The mobile station 18 provides a sending- and receiving unit 22, a display 24 and an input unit 26 in the form of a keyboard. For example, a menu displayed on a display 24 may be controlled by means of the input unit 26.

The chip card 10 is normally used as an identification and authentication means for the subscriber in mobile networks. The chip card 10 provides a processor 28 which can access a memory 30. Preferably, the memory is a chip. The chip card 10 is equipped with its own calculating capacity due to the processor. The processor 28 manages the memory 30 and transfers data and control commands via the contacts 12 or 14, respectively, and data lines and control command lines 32 to the mobile station. In the memory 30 an operating system 34 is provided. As a result the chip card 10 obtains its own data and memory management independent from the mobile station 18. A memory management system, in particular, the processor 28 and the operating system manage the memory 30.

Applications, which can either be saved on the mobile station 18 or on the chip card 10, use the memory on the chip card 10. In order to enable the applications to use the memory 30 on the chip card 10 they need to obtain information about actual memory capacity. For this purpose, the application starts a request to the memory management system of the chip card 10. The application, therefore, transmits a requirement request.

The process flow of the management of the memory 30 on the chip card is described in FIG. 2. Initially, the processor 28 determines the available free memory capacity of the memory 30, box 36. Arrows 38 represent the respective next following step of the process flow. Once the size of the available space of the memory 30 is determined an appropriate release for data saving by an application is affected, box 40. Hereafter, the application can fully or partially use the memory 30 in order to save data. Accordingly, the application can also delete data from the memory 30. Additional memory of the memory 30 is then released. Box 42 represents the use and/or deletion of data in the memory 30. The information about the actual free memory space is then adapted, box 44. This information usually consists of a digital value that is stored in a fixed memory location. It is provided to reorganize the memory 30 and to reallocate applications, box 46. The method can then restart at box 36 with the next request by an application. To prevent the memory 30 from overflowing the requirement request related to the memory capacity is compared to the actual free memory capacity. If the requirement is lower than or equal to the actual free available memory capacity, the memory space can be attributed to the application.

In FIGS. 3 and 4 the memory management by the processor 28 is described. The overall memory capacity 30 of the chip card 10 is shown in FIGS. 3 and 4 in its full capacity. A nonvolatile memory area 48 is reserved for the operating system 34. The operating system is usually located in the non volatile memory area 48 so that it remains in that memory area 48 even after switching off. Numeral 50 denotes a free memory space. This free memory space is shown without hatched lines and is available for different applications. An information of the actual available free memory space is stored at the memory location 52. Usually, this is a digital indication of its size. Hatched memory area 54 is shown beside the operating system 34 used for data 56, 58. The data 56, 58 can, for example, be program data or data of a database such as address data.

In FIG. 3 data 58 are located in the memory 30. FIG. 4 does not show such data. They have been deleted. The used or free memory space 54, 50, respectively, is represented as a void represented by values 0, A, B, C, and D in FIG. 3 and by values 0', A', B, C', and D' in FIG. 4. In FIG. 4 the memory space used for data extends to C. The operating systems uses the same memory space from 0 to A. Data 56 requested by a first application are located in the memory area A to B and data 58 requested by a second application are located in the memory area B to C. The free memory space 50 is defined by the memory area C to D in FIG. 3. In the present embodiment, the memory location 52 with the information about the available free memory is shown behind the free memory space 50, i.e. behind D. A request by an application would result in that the free memory space 50 is available.

If the data 58 are removed, as shown in FIG. 4, more free memory space 50 will be available. Memory space B' to C' is added to the free memory space 50. The available free memory area for applications starts with B' and ends with D'. The memory location 52 always contains the value of the free memory space 50. This value is dynamically adapted to the actual data allocation upon any change inside the memory 30.

The memory and data management can divide the memory in subsections 56a, 56b and 56c. Each subsection 56a, 56b and 56c can be administered separately upon request. This allows for example that applications can be executed in an own memory area without affecting other applications in other memory areas for example 58. The allocation of subsections 56a, 56b and 56c is also stored in the memory location 52. The access state of the memory 30 and/or subsections 56a, 56b and 56c is stored in the memory location of the memory 30. There it is stored if an application is allowed to access a memory area 54 at all. A "read only" state can be assigned to at least one memory area 54. In such a way the memory area can be read but not be deleted or overwritten.

Wild-cards p, q are provided in order to avoid that the memory 30 is used twice by the same data 58 with the same content. They are available for an application and point directly to the data 58 of the memory 30. Hence, an application accesses the wild-cards p, q and gets redirected to the corresponding file is if the data are stored multiple times. Therefore the memory management of the chip card 10 spares the resources of memory 30, while allocating memory space.

The invention claimed is:

1. A method for administering a memory of a chip card by means of a processor provided for controlling said memory, wherein said memory is provided on the chip card comprising a memory management system with a processor and an operating system stored in the memory, wherein said memory has an available memory capacity adapted to store data; said method comprising the steps of:
   determining said available data memory capacity;
   releasing said memory for storing said data thereby creating a used memory space and a remaining free memory space;
   storing and deleting data in said memory;
   storing an indication of said free memory space and adapting said stored indication of an actual amount of said free memory space;
   reorganizing and allocating said free memory space;
   determining that data having identical content is stored in said memory and applications are provided for simultaneous use of said identical, content data; and
   forming links in said memory to be used when said identical content data is simultaneously utilized by different application users of said memory.

2. A method according to claim 1, further comprising the steps of:
   determining of a required memory space required by a file or an application; said required memory space is based on a file size and based on whether said identical content data has already been stored in the memory, wherein upon determining that said identical content data has been stored in the memory said required memory space is minimized through utilization of said memory links;
   determining said free memory space; and
   comparing said required memory space with said free memory space determined according to the steps of determining the required memory space and the free memory space.

3. A method according to claim 1, wherein a signal is generated when said free memory space is insufficient.

4. A method according to claim 1, wherein information regarding said free memory space is obtained and stored in a defined location of said memory.

5. A method according to claim 1, wherein said free memory space is dynamically detected and a display is provided for continuously displaying said dynamically detected free memory space.

6. A method according to claim 1, wherein a wild-card is provided for a file.

7. A method according to claim 1, wherein said chip card consists of a group including SIM-, USIM-, bank and medical card.

8. A method according to claim 1, wherein said chip card is a memory card.

9. A chip card comprising:
   a chip with a memory provided on a chip card, said chip memory is managed by a processor-controlled memory management system with a processor unit and an operating system stored in the memory, an arrangement for identifying used and free memory, an arrangement for displaying said actual free memory space;
   said processor unit for the memory management system is provided on said chip card, said operating system including instructions for said memory management system;
   an arrangement for determining available data memory capacity and determining that data having identical content is stored in said memory and applications are provided for simultaneously use of said identical content data;
   links are formed in said memory to be utilized when said identical content data is simultaneously utilized by different application users of said memory; and
   an arrangement for determining a required memory space for a file or an application, said required memory space is based on a file size and whether said identical content data has already been stored in the memory, so that upon determining that said identical content data has been stored in, the memory said required memory space is minimized through utilization of said memory links.

10. A chip card according to claim 9, wherein a processor unit for said memory management system is provided on said chip card.

11. A chip card according to claim 9, wherein an operating system is provided in said memory, said operating system including instructions for said memory management system.

12. A chip card according to claim 9, wherein said chip card consists of a group including SIM-, USIM-, bank and medical card.

13. A chip card according to claim 9, wherein said chip card is a memory card.

* * * * *